United States Patent
Egawa

(10) Patent No.: US 7,801,196 B2
(45) Date of Patent: Sep. 21, 2010

(54) LIGHT SOURCE DEVICE, LIGHTING DEVICE, MONITORING DEVICE, AND IMAGE DISPLAY APPARATUS

(75) Inventor: Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 28 days.

(21) Appl. No.: 12/273,984

(22) Filed: Nov. 19, 2008

(65) Prior Publication Data

US 2009/0141761 A1 Jun. 4, 2009

(30) Foreign Application Priority Data

Nov. 30, 2007 (JP) ............... 2007-310002
Sep. 8, 2008 (JP) ............... 2008-229468

(51) Int. Cl.
 *H01S 5/00* (2006.01)
(52) U.S. Cl. ............. 372/50.12; 372/38.02; 372/38.03; 372/50.121; 372/50.122; 372/50.124; 372/81
(58) Field of Classification Search ............. 372/38.02, 372/50.12, 50.121, 50.122, 50.124, 38.03, 372/81
See application file for complete search history.

(56) References Cited

U.S. PATENT DOCUMENTS

| | | | |
|---|---|---|---|
| 5,809,052 A | * | 9/1998 | Seko et al. ............. 372/50.121 |
| 6,741,625 B2 | * | 5/2004 | Hirata ............. 372/50.121 |
| 7,260,131 B2 | * | 8/2007 | Grenier et al. ............. 372/50.12 |
| 2002/0075930 A1 | | 6/2002 | Hirata |

FOREIGN PATENT DOCUMENTS

| | | | |
|---|---|---|---|
| JP | 09-052389 | | 2/1997 |
| JP | 2001-313171 | | 11/2001 |
| JP | 2001313171 A | * | 11/2001 |
| JP | 2002-141604 | | 5/2002 |
| JP | 2004-325630 | | 11/2004 |
| JP | 2005-107009 | | 4/2005 |

OTHER PUBLICATIONS

Aram Mooradian, et al; High Power Extended Vertical Cavity Surface Emitting Diode Lasers and Arrays and Their Applications, Micro-Optics Conference, Tokyo Japan Nov. 2, 2005.

* cited by examiner

*Primary Examiner*—Minsun Harvey
*Assistant Examiner*—Yuanda Zhang
(74) *Attorney, Agent, or Firm*—Workman Nydegger

(57) ABSTRACT

A light source device includes a plurality of first laser emission units and a plurality of second laser emission units for emitting light. The plurality of first laser emission units and the plurality of second laser emission units are disposed on a flat surface. The first laser emission units and the second laser emission units are composed so that a drive for light emission is sequentially switched. Each of the second laser emission units is disposed between the adjoining first laser emission units.

14 Claims, 10 Drawing Sheets

LIGHT SOURCE DEVICE, LIGHTING DEVICE, MONITORING DEVICE, AND IMAGE DISPLAY APPARATUS

BACKGROUND

1. Technical Field

The invention relates to a light source device, a lighting device, a monitoring device, and an image display apparatus, and particularly to a technology of a light source device having a plurality of light emission units.

2. Related Art

Recently, a technology of a light source device which uses laser beam source as a light source for an image display apparatus such as a projector has been proposed. The laser beam source has been developed as the light source of the image display apparatus with output increase and color multiplication of the image display apparatus. When compared with UHP lamp used as a light source of an image display apparatus in related art, the laser beam source has advantages such as high color reproducibility, instant lighting, and long life. Currently, there is a demand for luminance increase of the image display apparatus. For increasing output of the laser beam source, a semiconductor element having a plurality of light emission units for emitting light is used, for example. Since a large proportion of current supplied to the semiconductor element is converted into heat, higher heat release efficiency is required for the laser beams source as the density of the light emission units increases. When heat release is insufficient, the temperature of the semiconductor element rises. As a result, light emission efficiency of the semiconductor element lowers. Moreover, deterioration of the semiconductor element increases with the rise of the temperature of the semiconductor element, and thus the life of the laser beam source becomes short. For overcoming these drawbacks, JP-A-2002-141604 proposes a method which separates the plural light emission units into a main light emission group and a sub light emission group provided in different areas, and switches operation between the main light emission group and the sub light emission group, for example. When the light amount of the entire main light emission group lowers during drive of the main light emission group, the main light emission group is switched to the sub light emission group. By this method, the entire output of the laser beam source is maintained, and also the life of the overall laser beam source is extended.

Both of the light emission units constituting the main light emission group and the sub light emission group are arranged with a pitch capable of reducing effect on the light emission efficiency and life of the semiconductor element. In this case, the area of the semiconductor element increases by the separation of the main light emission group and sub light emission group in different regions. The manufacturing cost of the semiconductor element greatly depends on the number of semiconductor elements which can be produced from one piece of wafer. Thus, the cost of the laser beam source rises as the size of the semiconductor element increases. Moreover, the position of the light emission area considerably changes from the period of driving the main light emission group to the period of driving the sub light emission group. Thus, there is a possibility that utilization efficiency of light emitted from the laser beam source lowers in devices and optical systems using this type of laser beam. According to the related art, therefore, the size of the element for emitting light increases and the position of the light emission area considerably changes when higher light emission efficiency and longer life of the light source device are desired.

SUMMARY

It is an advantage of some aspects of the invention to provide a light source device having high light emission efficiency and long life and capable of decreasing size of an element for emitting light and position change of a region for light emission, and a lighting device, a monitoring device, and an image display apparatus including this light source device.

A light source device according to a first aspect of the invention includes a plurality of first laser emission units and a plurality of second laser emission units for emitting light. The plurality of first laser emission units and the plurality of second laser emission units are disposed on a flat surface. The first laser emission units and the second laser emission units are composed so that a drive for light emission is sequentially switched. Each of the second laser emission units is disposed between the adjoining first laser emission units.

The pitch of the first laser emission units is set at a pitch capable of reducing the effect on the light emission efficiency and life of the light emission element during the period for driving the first laser emission units. Also, the pitch of the second laser emission units is set at a pitch capable of reducing the effect on the light emission efficiency and life of the light emission element during the period for driving the second laser emission units. Since driving is sequentially switched between the first laser emission units and the second laser emission units, the distance between the adjoining first laser emission unit and the second laser emission unit can be set at a length shorter than that necessary for reducing the effect on the light emission efficiency or the like caused by heat. By disposing each of the second laser emission units between the adjoining first laser emission units, the laser emission units can be provided with high density, and the size of the light emission element can be decreased. By disposing each of the second laser emission units between the adjoining first laser emission units, the change in the position of the light emission area can be decreased. Since driving is sequentially switched between the first laser emission units and the second laser emission units, high light emission efficiency and long life can be achieved. Accordingly, the light source device can offer advantages such as high light emission efficiency, long life, size reduction of the light emission element, and reduction of position change of the region for light emission.

A light source device according to a second aspect of the invention includes a plurality of first laser emission units and a plurality of second laser emission units for emitting light. The plurality of first laser emission units and the plurality of second laser emission units are disposed on a flat surface. The first laser emission units and the second laser emission units are composed so that a drive for light emission is sequentially switched. Assuming that an area containing the plural first laser emission units on the flat surface is a first area, and that an area containing the plural second laser emission units on the flat surface is a second area, the first area includes at least a part of the second area.

By disposing the first laser emission units in the first area so defined as to contain at least a part of the second area and the second laser emission units in the second area, the size of the light emission element can be reduced compared with the structure which sequentially switches driving between light emission groups provided in different areas on the flat surface. Moreover, the position change of the area for light emission can be reduced. Since driving between the first laser emission units and second laser emission units is sequentially switched, high light emission efficiency and long life can be achieved. Accordingly, the light source device can offer advantages such as high light emission efficiency, long life, size reduction of the light emission element, and reduction of position change of the region for light emission.

It is preferable that each of the first area and the second area is a rectangular area which can be defined on the flat surface by two first outer lines substantially parallel with each other and two second outer lines substantially orthogonal to the first outer lines and substantially parallel with each other. In this case, the first outer lines of the first area and the first outer lines of the second area almost coincide with each other or shift from each other by a length between the center positions of the adjoining first laser emission unit and the second laser emission unit or shorter, and the second outer lines of the first area and the second outer lines of the second area almost coincide with each other or shift from each other by a length between the center positions of the adjoining first laser emission unit and the second laser emission unit or shorter. The first area and the second area are defined such that most parts of those areas overlap with each other. Thus, the size of the light emission element can be further decreased, and position change of the area for light emission can be further reduced.

It is preferable that the number of the first laser emission units is equal to the number of the second laser emission units. According to this structure, fluctuations in the output from the light source device between the period for driving the first laser emission units and the period for driving the second laser emission units can be reduced.

It is preferable that the area of the first area is substantially equal to the area of the second area. According to this structure, change of the area size for light emission between the period for driving the first laser emission units and the period for driving the second laser emission units can be reduced.

It is preferable that the first laser emission units and the second laser emission units are provided on the same substrate. According to this structure, light can be emitted from the same flat surface during both the period for driving the first laser emission units and the period for driving the second laser emission units.

It is preferable that the first laser emission units and the second laser emission units are alternately disposed at least in either a first direction or a second direction substantially perpendicular to the first direction. According to this structure, each of the second laser emission units is disposed between the adjoining first laser emission units at least in either the first direction or the second direction.

It is preferable that the first laser emission units and the second laser emission units are alternately disposed in both the first direction and the second direction. According to this structure, each of the second laser emission units is disposed between the adjoining first laser emission units in both the first direction and the second direction. Moreover, the first laser emission units and the second laser emission units can be provided on the overlapping area of the first area and the second area with substantially the same density.

It is preferable to further include a wavelength conversion element which converts wavelengths of lights emitted from the plural first laser emission units and plural second laser emission units. In this case, the plural first laser emission units and the plural second laser emission units are disposed in a region narrower than the cross section of the wavelength conversion element substantially orthogonal to light entering from the plural first laser emission units and the plural second laser emission units into the wavelength conversion element. According to this structure, the wavelengths of lights emitted from the plural first laser emission units and the plural second laser emission units can be efficiently converted.

A light source device according to a third aspect of the invention includes a plurality of first laser emission units and a plurality of second laser emission units for emitting light. The plurality of first laser emission units and the plurality of second laser emission units are disposed on a flat surface. The first laser emission units and the second laser emission units are composed so that a drive for light emission is sequentially switched. Each of the second laser emission units is disposed between the adjoining first laser emission units. Assuming that the minimum pitch which only produces allowable effect on light emission efficiency of the plural first laser emission units and the plural second laser emission units and allowable effect on lives of the plural first laser emission units and the plural second laser emission units at the time of simultaneous driving of the plural first laser emission units and the plural second laser emission units is an allowable limit pitch, the pitch of the respective first laser emission units is larger than the allowable limit pitch, the pitch of the respective second laser emission units is larger than the allowable limit pitch, and the pitch of the adjoining first laser emission units and the second laser emission units is smaller than the allowable limit pitch.

The description "allowable effect on light emission efficiency" refers to that predetermined light emission efficiency such as the light emission efficiency determined by the standard or specification of the corresponding product is satisfied, for example. The description "allowable effect on lives" refers to that predetermined period during which the original function of the light emission element can be maintained such as service life determined by the standard or specification of the corresponding product is satisfied, for example. In this structure, the pitch of the respective first laser emission units is larger than the allowable limit pitch, and the pitch of the respective second laser emission units is larger than the allowable limit pitch. Thus, the effect on the light emission efficiency and life becomes allowable, which contributes high light emission efficiency and long life. Moreover, the pitch of the adjoining first laser emission units and the second laser emission units is smaller than the allowable limit pitch. Thus, the size of the light emission element and position change of the area for light emission can be reduced.

It is preferable that driving is switched from the plural first laser emission units to the plural second laser emission units after the temperature of the plural first laser emission units becomes steady condition. In this case, driving is switched from the plural second laser emission units to the plural first laser emission units after the temperature of the plural second laser emission units becomes steady condition. The description "temperature becomes steady condition" refers to the condition in which convergence of the temperature to a certain temperature is recognized after gradual decrease of temperature change. In this case, the cycle for switching between the first laser emission units and the second laser emission units can be extended. Thus, flickering can be reduced.

It is preferable that driving is switched between the plural first laser emission units and the plural second laser emission units every time the difference in the maximum light amount between the plural first laser emission units and the plural second laser emission units becomes a threshold set in advance. According to this structure, difference in luminance is not easily recognized even when driving is switched between the first laser emission units and the second laser emission units on a long cycle. Thus, flickering can be further reduced.

A lighting device according to a fourth aspect of the invention includes the light source device described above to illuminate an illumination target using light emitted from the light source device. The lighting device obtains high efficiency and long life by using the light source device.

A monitoring device according to a fifth aspect of the invention includes: the lighting device described above; and an image pickup unit which obtains an image of a subject illuminated by the lighting device. The monitoring device obtains high efficiency and long life by using the light source device.

An image display apparatus according to a sixth aspect of the invention includes the light source device described above to display an image using light emitted from the light source device. The image display apparatus attains high efficiency and long life by using the light source device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described in detail with reference to the drawings.

First Embodiment

Figure 1:
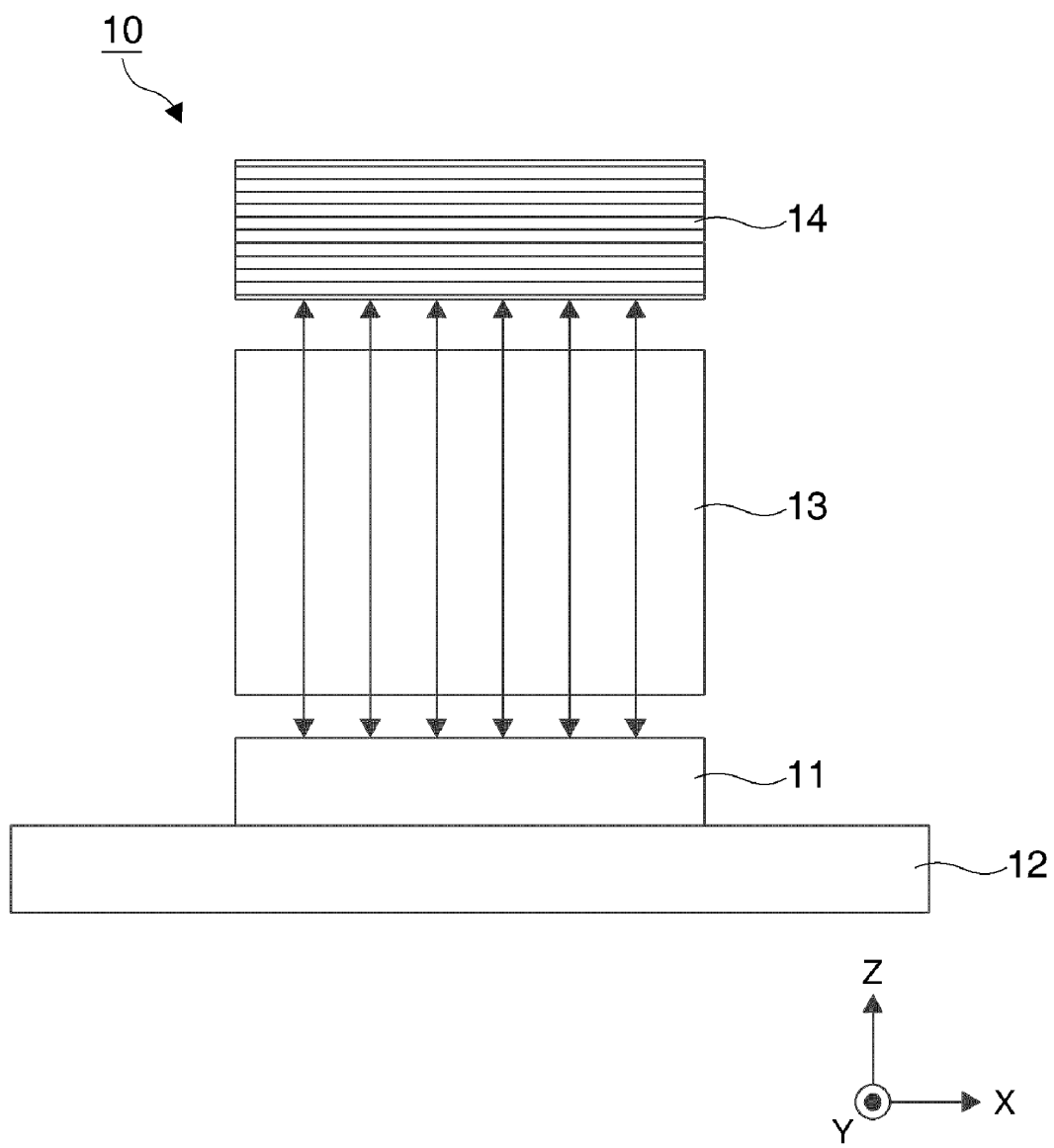
FIG. 1 schematically illustrates a structure of a light source device according to a first embodiment.

FIG. 1 schematically illustrates a structure of a light source device 10 according to a first embodiment of the invention. The light source device 10 is an array laser which includes a semiconductor element 11, a second-harmonic generation (SHG) element 13, and a volume hologram 14. The semiconductor element 11 is a surface light emission type array light source having a plurality of laser emission units for emitting fundamental light having first wavelength. The fundamental light herein is infrared light, for example. The semiconductor element 11 has a not-shown mirror layer for reflecting light having the first wavelength. The semiconductor element 11 is mounted on a sub mount 12. The sub mount 12 is a heat release substrate for releasing heat generated from the semiconductor element 11.

The SHG element 13 receives fundamental light from the semiconductor element 11 and releases higher harmonic light having second wavelength. The second wavelength corresponds to half of the first wavelength. The SHG element 13 is a wavelength conversion element for converting the wavelength of light emitted from the laser emission units of the semiconductor element 11. The higher harmonic light herein is visible light, for example. The SHG element 13 is constituted by periodically poled lithium niobate (PPLN) as polarization inverted crystal of lithium niobate ($LiNbO_3$) functioning as non-linear optical crystal. By using the SHG element 13, a sufficient amount of light having desired wavelength can be supplied from a general-purpose light source easily available.

The volume hologram 14 functions as an external resonator which resonates the fundamental light emitted from the semiconductor element 11 in the space between the volume hologram 14 and the mirror layer of the semiconductor element 11. The volume hologram 14 is a narrow-band reflection mirror having reflection characteristics which exhibit half width of several nanometers or smaller around the first wavelength. The volume hologram 14 transmits light having a wide wavelength range including the second wavelength in the visible region. The volume hologram 14 is constituted by VHG (volume holographic grating), for example. The VHG is formed by photo-refractive crystal such as $LiNbO_3$ and BGO, polymer, or the like.

The fundamental light emitted from the laser emission units of the semiconductor element 11 enters the SHG element 13. The higher harmonic light generated by the SHG element 13 and then transmitted through the volume hologram 14 is released to the outside of the light source device 10. The fundamental light having passed through the SHG element 13 from the semiconductor element 11 side is reflected by the volume hologram 14. The fundamental light reflected by the volume hologram 14 enters the SHG element 13. The fundamental light having entered the SHG element 13 from the volume hologram 14 and passed through the SHG element 13 enters the semiconductor element 11. The fundamental light having entered the semiconductor element 11 is reflected by the mirror layer of the semiconductor element 11, and released from the semiconductor element 11 toward the SHG element 13. The fundamental light reflected by the mirror layer and the volume hologram 14 is amplified by resonance with fundamental light newly emitted from the laser emission units.

Figure 2:
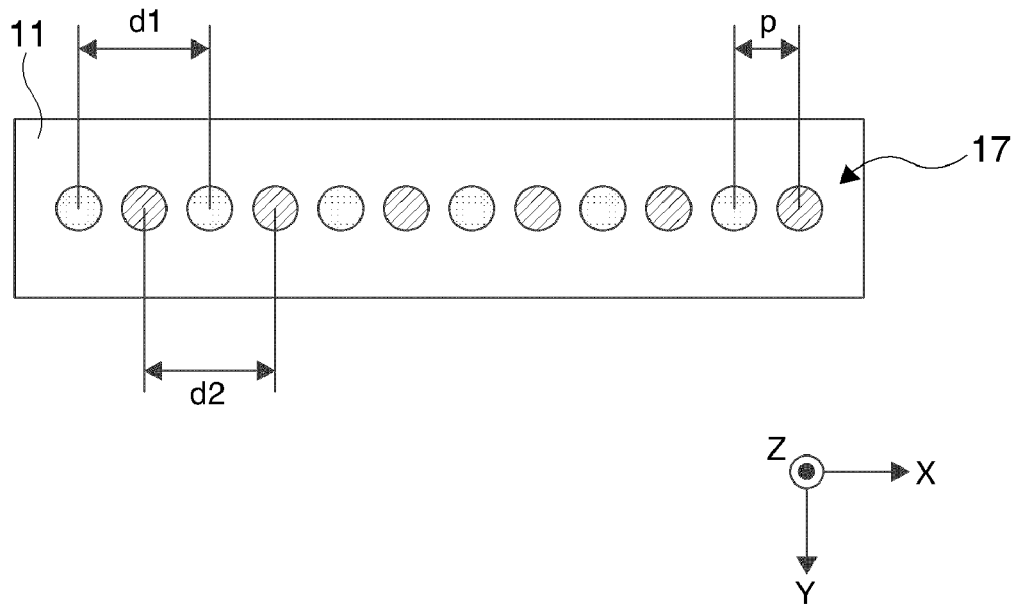
FIG. 2 illustrates a structure of a semiconductor element in the plan view.

FIG. 2 illustrates the structure of the semiconductor element 11 in the plan view. The semiconductor element 11 has twelve laser emission units 17 disposed in parallel in a first direction. The first direction for disposing the twelve laser emission units 17 corresponds to X axis. A second direction corresponds to Y axis substantially orthogonal to the first direction. The respective laser emission units 17 are provided on the XY plane as a flat surface containing the first direction and the second direction. A Z axis direction extends substantially orthogonal to the X axis and Y axis directions. Each of the laser beam emission units 17 emits fundamental light in the Z axis direction. The semiconductor element 11, and the SHG element 13 and the volume hologram 14 shown in FIG. 1 are arranged in parallel in the Z axis direction. The laser emission units 17 are disposed such that the length between the center positions of each adjoining pair of a first laser emission unit and a second laser emission unit becomes a substantially equal length p.

The twelve laser emission units 17 are constituted by six first laser emission units and six second laser emission units. The first laser emission units are represented as dotted parts in the figure. The second laser emission units are represented as diagonally hatched parts in the figure. The first laser emission units and the second laser emission units are provided on the same substrate constituting the semiconductor element 11. The first laser emission units and the second laser emission units are alternately disposed in the X axis direction as the first direction. Each of the first laser beam emission units is positioned next to the second emission unit in the X axis direction. Each of the second laser beam emission units is located between the first laser emission units. Each length between the center positions of the adjoining first laser emission units becomes substantially the same length d1. Each length between the center positions of the adjoining second laser emission units becomes substantially the same length d2. Each of the length d1 between the first laser emission units and the length d2 between the second laser emission units corresponds to twice longer than the pitch p for disposing the laser emission units 17.

Figure 3:
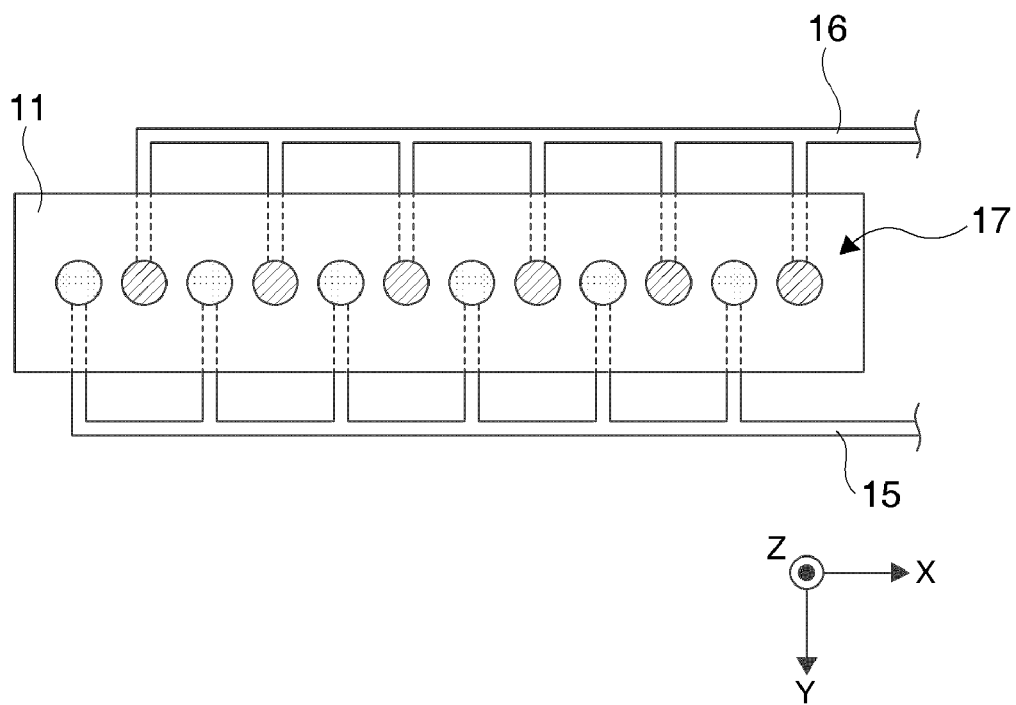
FIG. 3 illustrates a structure for driving respective light emission units.

FIG. 3 illustrates a structure for driving the respective laser emission units 17. A first wiring unit 15 is connected with the respective first laser emission units. The first laser emission units emit light by power supplied via the first wiring unit 15. A second wiring unit 16 is connected with the respective second laser emission units. The second laser emission units emit light by power supplied via the second wiring unit 16. Thus the first laser emission units and the second laser emission units are composed so that a drive for light emission is sequentially switched.

Figure 4:
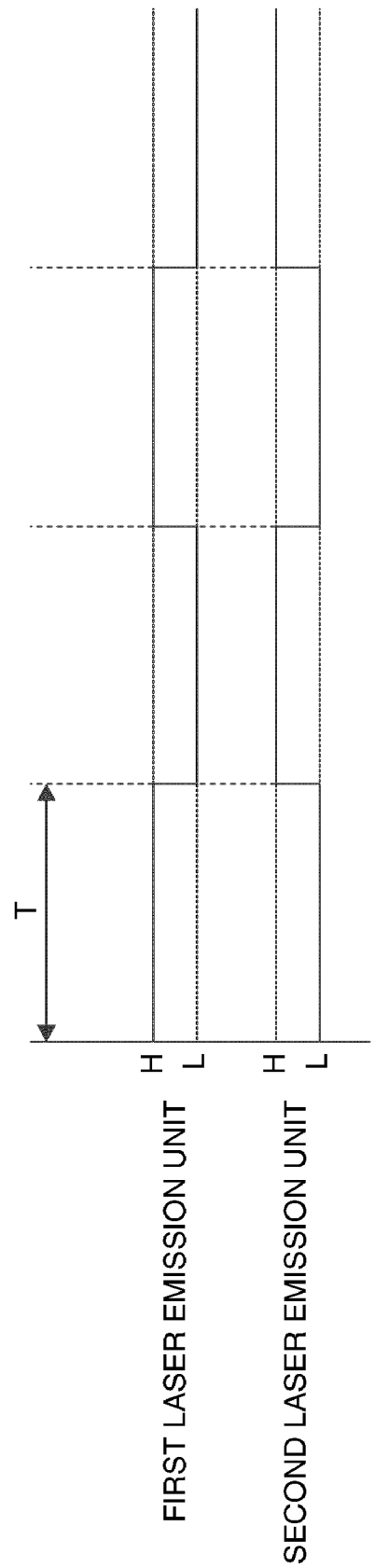
FIG. 4 illustrates a drive signal for first light emission units and a drive signal for second light emission units.

FIG. 4 illustrates a drive signal for driving the first laser emission units and a drive signal for driving the second laser emission units. Driving power is supplied to the laser emission units 17 while the drive signal is "H". While the first laser emission units are being driven, power supply to the second laser beam units is stopped. After elapse of a fixed time T from the start of power supply to the first laser emission units, power supply to the first laser emission units is stopped, and power supply to the second laser emission units is started. While the second laser emission units are being driven, power supply to the first laser beam units is stopped. After elapse of the fixed time T from the start of power supply to the second laser emission units, power supply to the second laser emission units is stopped, and power supply to the first laser emission units is again started. The light source device 10 has a switching unit for sequentially switching between power supply using the first wiring unit 15 and power supply using the second wiring unit 16 after elapse of each fixed time T. By this method, driving for light emission is alternately switched between the first laser emission units and the second laser emission units. The fixed time T may be appropriately determined according to the degree of deterioration of the semiconductor element 11 caused by actuation of the laser emission units 17, such as about 100 hours. By providing the first laser emission units and the second laser emission units on the same substrate, light can be emitted from the same flat surface during the period for driving the first laser emission units and the period for driving the second laser emission units.

Figure 5:
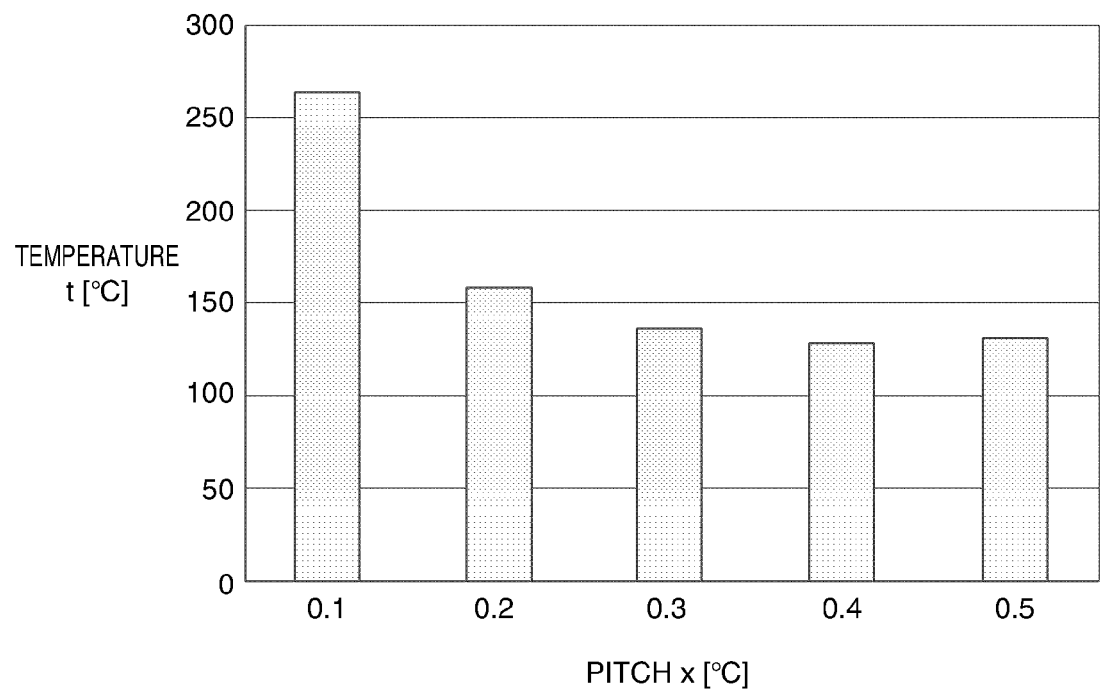
FIG. 5 shows the relationship between pitch and temperature of the light emission units.
Figure 6:
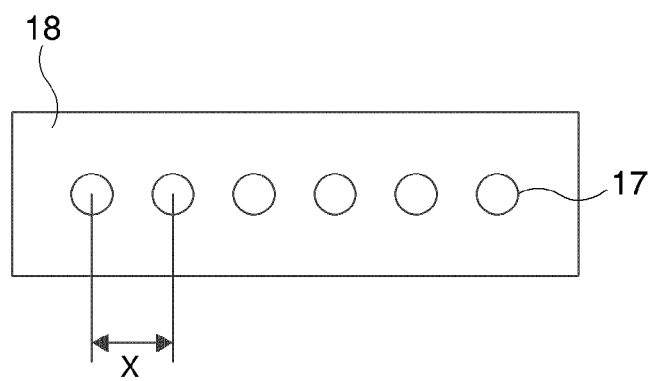
FIG. 6 illustrates a structure of a semiconductor element used in simulation in the plan view.

FIG. 5 shows an example of the relationship between a pitch x of the laser emission units 17 and a time t of the laser emission units 17 when the respective laser emission units 17 are driven at the same time. The simulation result obtained by a semiconductor element 18 shown in the plan view of FIG. 6 is herein discussed. The semiconductor element 18 has six laser emission units 17 disposed in a line in parallel with each other. The semiconductor element 18 generates heat of 1 W in a circular range having diameter of 0.1 mm per one laser emission unit 17 when light is emitted from the laser emission units 17. The semiconductor element 18 has a GaAs substrate having heat conductivity of 44 W/m·K.

When light is simultaneously emitted from the respective laser emission units 17 disposed with the pitch x of 0.1 mm, the temperature t of the laser emission units 17 becomes 260° C. The temperature t of the laser emission units 17 lowers as the pitch x of the laser emission units 17 increases from 0.1 mm. When the pitch x of the laser emission units 17 is 0.3 mm or longer, the temperature t of the laser emission units 17 becomes substantially constant around 130 degrees. When light is simultaneously emitted from the respective laser emission units 17, the pitch x of the laser emission units 17 is set at 0.3 mm, for example, for reducing the effect on the light emission efficiency and life of the semiconductor element 18 and increasing the density of the laser emission units 17 as much as possible.

Based on the above results, in case of the light source device 10 in this embodiment, the pitch d1 of the first laser emission units simultaneously driven is set at 0.3 mm. Also, the pitch d2 of the second laser emission units simultaneously driven is set at 0.3 mm. By alternately disposing the first laser emission units and the second laser emission units, each length between the center position of the first laser emission units and the second laser emission units becomes 0.15 mm. The pitch p of the laser emission units 17 of the semiconductor element 11 can thus be set at 0.15 mm. Accordingly, the pitch p of the laser emission units 17 can be set at a length smaller than the pitch necessary for reducing the effect on the light emission efficiency and the like caused by heat.

When drive of the light emission unit groups is sequentially switched for each region on the flat surface, it is necessary to secure 0.3 mm for the pitch of the laser emission units 17 based on the simulation results of the pitch required for reducing the effect on the light emission efficiency by heat. However, by alternately disposing the first laser emission units and the second laser emission units for alternately switching driving these units, the pitch of the laser emission units 17 can be reduced to 0.15 mm. Thus, the size of the semiconductor element 11 can be decreased by providing the laser emission units 17 with high density.

In the structure which sequentially switches driving between light emission unit groups disposed in different regions, the position of light emission area considerably changes every time the driving of the light emission unit groups is switched. However, the change of the position of the light emission area can be reduced by alternately disposing the first laser emission units and the second laser emission units.

Moreover, the pitch of the respective first laser emission units is larger than the allowable limit pitch. Also, the pitch of the respective second laser emission units is larger than the allowable limit pitch. However, the pitch of the adjoining first laser emission units and the second laser emission units is smaller than the allowable limit pitch. The allowable limit pitch herein refers to the minimum pitch of the laser emission units 17 which produces allowable effect on light emission efficiency and life of the plural first laser emission units and plural second laser emission units when the plural first laser emission units and plural second laser emission units are simultaneously driven.

By disposing the first laser emission units simultaneously driven with the pitch larger than the allowable limit pitch and the second laser emission units simultaneously driven with the pitch larger than the allowable limit pitch, predetermined light emission efficiency and service life determined as standard or specification of the semiconductor element 11 can be satisfied. Also, by disposing the first laser emission units and the second laser emission units with the pitch smaller than the allowable limit pitch, the size of the semiconductor element 11 and position change of the light emission area can be reduced.

By alternately switching drive between the first laser emission units and the second laser emission units, light emission efficiency and life of the light source device 10 can be increased. Thus, advantages such as high light emission efficiency, long life, size reduction of the semiconductor element 11, and reduction of position change of the light emission area can be offered. Since the numbers of the first laser emission units and the second laser emission units are the same, fluctuations in the output of the light source device 10 caused by alternately switching the first laser emission units and the second laser emission units can be reduced.

The number of the laser emission units 17 disposed in parallel in the X axis direction is not limited to the number shown in this embodiment, but may be any number larger than one. The numbers of the first laser emission unit and the second laser emission units are not limited to the same number, but may be different numbers. The light source device 10 may have optical element such as wavelength selection filter and polarization selection filter as necessary. The light source device 10 is not limited to the one having the wavelength conversion element, but may be the one which emits light from the semiconductor element 11 without wavelength conversion. The light source device 10 may be constituted by diode pumped solid state (DPSS) laser.

Second Embodiment

Figure 7:
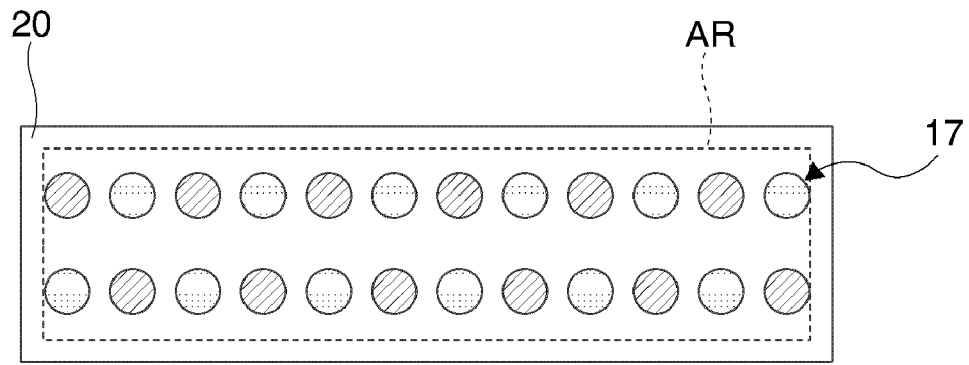
FIG. 7 illustrates a structure of a semiconductor element included in a light source device according to a second embodiment in the plan view.

FIG. 7 illustrates a structure of a semiconductor element 20 included in a light source device according to a second embodiment of the invention in the plan view. Similar reference numbers are given to parts similar to those in the first embodiment, and the same explanation is not repeated. The semiconductor element 20 has twenty-four laser emission units 17. Twelve laser emission units 17 are disposed in the X axis direction as the first direction, and two laser emission units 17 are disposed in the Y axis direction as the second direction. The twenty-four laser emission units 17 are constituted by twelve first laser emission units, and twelve second laser emission units. The first laser emission units and the second laser emission units are alternately disposed in both the X axis direction and Y axis direction. Each of the second laser emission units is provided between the adjoining first laser emission units.

Figure 8:
FIG. 8 illustrates an effective range on XY cross section of an SHG element.

FIG. 8 illustrates an effective range E on the XY cross section of the SHG element 13. The XY cross section is substantially orthogonal to light entering from the laser emission units 17 into the SHG element 13. The effective range E refers to a range which can effectively convert wavelength of light in the area of the SHG element 13. In case of the SHG element 13 having a thickness h of 500 µm, for example, the effective range E can be set as the range 100 µm inside from the surface of the SHG element 13.

All of the laser emission units 17 are disposed within a rectangular area AR equivalent to the effective range E on the XY cross section of the SHG element 13. By this arrangement, fundamental lights emitted from all the laser emission units 17 can efficiently enter the effective range E such that the wavelength of the fundamental lights can be efficiently converted. Thus, the size of the semiconductor element 20 and position change of the light emission area can be reduced similarly to the first embodiment. As a result, the size of the SHG element 13 can be also reduced in this embodiment. The semiconductor element 20 is not limited to the one which disposes all the laser emission units 17 within the rectangular area AR equivalent to the effective region E. It is only required that all the laser emission units 17 are disposed within an area smaller than the XY cross section of the SHG element 13. The total number of the laser emission units 17 and the number of the laser emission units 17 provided in the X axis direction and the Y axis direction are not limited to those in this embodiment, but may be changed in an appropriate manner.

Third Embodiment

Figure 9:
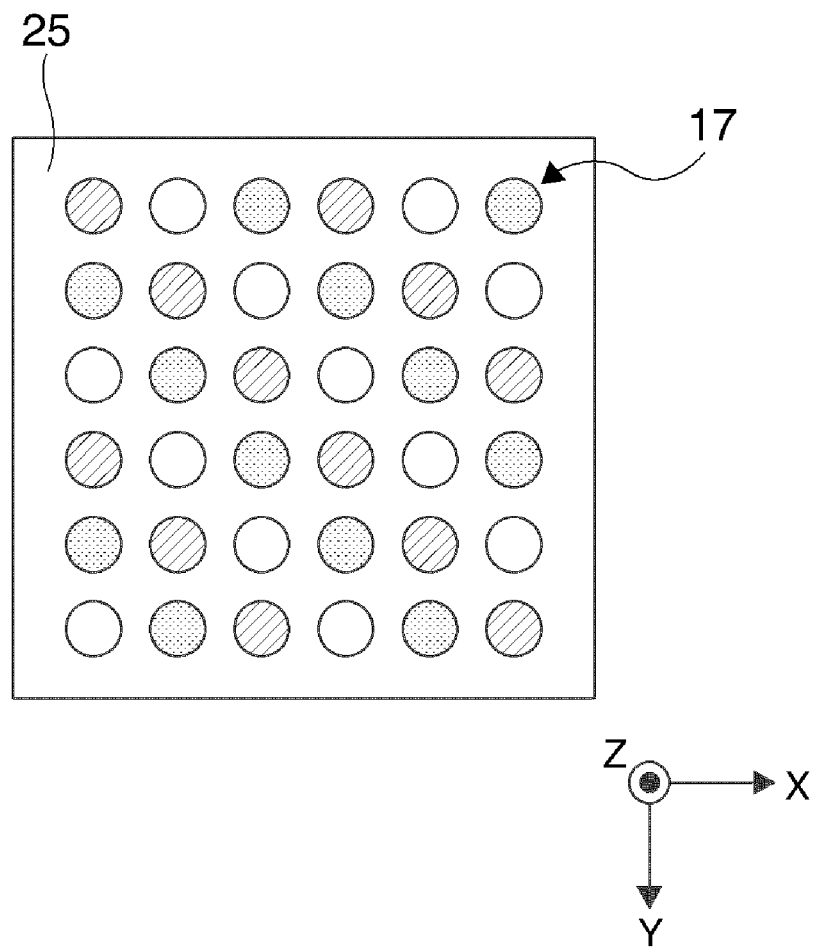
FIG. 9 illustrates a structure of a semiconductor element included in a light source device according to a third embodiment in the plan view.

FIG. 9 illustrates a structure of a semiconductor element 25 included in a light source device according to a third embodiment of the invention in the plan view. Similar reference numbers are given to parts similar to those in the first embodiment, and the same explanation is not repeated. The semiconductor element 25 has thirty-six laser emission units 17. Six laser emission units 17 are disposed in the X axis direction as the first direction, and six laser emission units 17 are disposed in the Y axis direction as the second direction. The thirty-six laser emission units 17 are constituted by twelve first laser emission units, twelve second laser emission units, and twelve third laser emission units. The third laser emission units are represented as white circles.

Each of the first laser emission units is located next to the second laser emission unit and the third laser emission unit in both the X axis direction and Y axis direction. Each of the second laser emission units and each of the third laser emission units are disposed between the adjoining first laser emission units in the X axis and the Y axis directions. Driving for light emission is sequentially switched between the first laser emission units, the second laser emission units, and the third laser emission units. Similarly to the above embodiments, high light emission efficiency and long life and further the size of the semiconductor element 25 and position change of the light emission area can be reduced similarly to the first embodiment. The light source device may divide the laser emission units into four groups between which driving operation can be sequentially switched.

Fourth Embodiment

Figure 10:
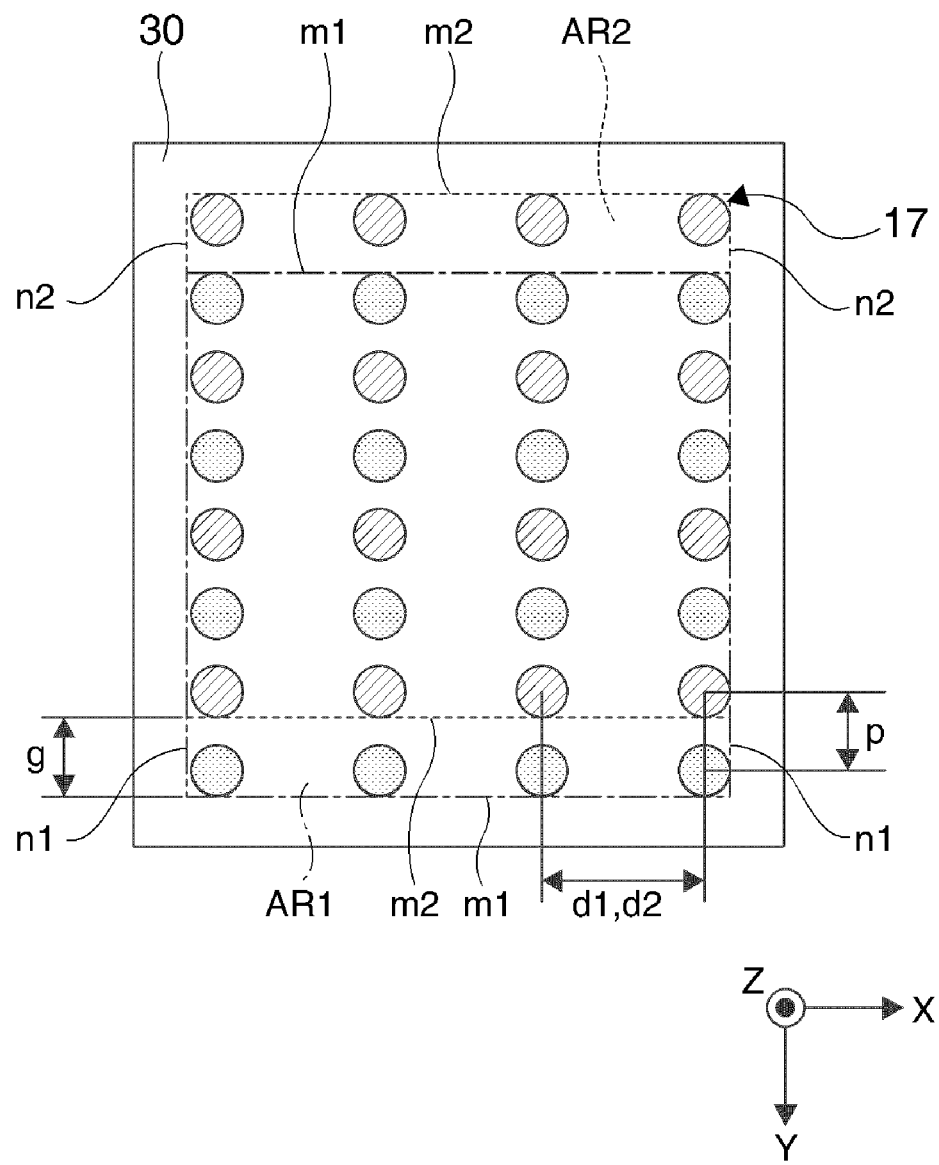
FIG. 10 illustrates a structure of a semiconductor element included in a light source device according to a fourth embodiment in the plan view.

FIG. 10 illustrates a structure of a semiconductor element 30 included in a light source device according to a fourth embodiment of the invention in the plan view. Similar reference numbers are given to parts similar to those in the first embodiment, and the same explanation is not repeated. The semiconductor element 30 has thirty-two laser emission units 17. Four laser emission units 17 are disposed in the X axis direction as the first direction, and eight laser emission units 17 are disposed in the Y axis direction as the second direction. The thirty-two laser emission units 17 are constituted by sixteen first laser emission units, and sixteen second laser emission units. The first laser emission units and the second laser emission units are alternately disposed in the Y axis direction. Each of the second laser emission units is disposed between the adjoining first laser emission units in the Y axis direction. The laser emission units 17 are disposed with the pitch p in the Y axis direction. The first laser emission units are provided in a line, and the second laser emission units are provided in another line in the X axis direction. The laser emission units 17 are disposed with a pitch d1(=d2) in the X axis direction.

A rectangular area containing the 16 first laser emission units on the XY plane is a first area AR1. A rectangular area containing the 16 second laser emission units on the XY plane is a second area AR2. The first area AR1 is defined on the XY plane by two first outer lines m1 substantially parallel with the X axis direction as the first direction, and two second outer lines n1 substantially parallel with the Y axis direction as the second direction. The first outer lines m1 and the second outer lines n1 are substantially orthogonal to each other. The first outer lines m1 and the second outer lines n1 are imaginary lines showing the contour of the first area AR1. The second area AR2 is defined on the XY plane by two first outer lines m2 substantially parallel with the X axis direction as the first direction, and two second outer lines n2 substantially parallel with the Y axis direction as the second direction. The first outer lines m2 and the second outer lines n2 are substantially orthogonal to each other. The first outer lines m2 and the second outer lines n2 are imaginary lines showing the contour of the second area AR2.

The first outer lines m1 of the first area AR1 are shifted from the first outer lines m2 of the second area AR2 by a length g in the Y axis direction. This length g is substantially equal to each length p between the center positions of the adjoining laser emission units 17 in the Y axis direction. The second outer line n1 of the first area AR1 and the second outer line n2 of the second area AR2 almost coincide with each other in the X axis direction. The first area AR1 contains the most part of the second area AR2. The area of the first area AR1 is approximately equal to that of the second area AR2. The density of the first emission units in the first area AR1 is substantially the same as that of the second emission units in the second area AR2.

By disposing the first laser emission units on the first area AR1 so defined as to contain the most part of the second area AR2 and disposing the second laser emission units on the second area AR2, the size of the semiconductor element 30 can be reduced compared with the structure which sequentially switches driving of light emission unit groups for each area on the flat surface. Moreover, position change of the light emission area can be reduced. Thus, similarly to the above embodiments, advantages such as high light emission efficiency and long life, size reduction of the semiconductor element 30, and reduction of position change of the light emission area can be realized.

The first outer lines m1 of the first area AR1 and the first outer lines m2 of the second area AR2 almost coincide with each other in the Y axis direction, or are disposed with shift of the length p between the center positions of the laser emission units 17 or shorter in the Y axis direction. The second outer lines n1 of the first area AR1 and the second outer lines n2 of the second area AR2 almost coincide with each other in the X axis direction, or are disposed with shift of the length p between the center positions of the laser emission units 17 or shorter in the X axis direction. In this case, the semiconductor element 30 can be constructed such that the first area AR1 contains the most part of the second area AR2.

The semiconductor element 30 is not limited to the one which includes the first outer lines m1 and m2 almost coinciding with each other or shifting from each other by the length p or shorter, or the second outer lines n1 and n2 almost coinciding with each other or shifting from each other by the length p or shorter. The semiconductor element 30 may be constructed otherwise as long as the first area AR1 contains at least a part of the second area AR2. In this structure, advantages such as size reduction of the semiconductor element 30 and reduction of position change of the light emission area can be offered. The first area AR1 and the second area AR2 are not required to have the same area, but may have different areas. Also, the numbers of the first laser emission units and the second laser emission units are not required to be the same number, but may be different numbers.

Similarly to this embodiment, the first area AR1 and the second area AR2 are defined such that the first area AR1 contains at least a part of the second area AR2 in the above embodiments. Also, similarly to this embodiment, the first outer lines m1 and m2 almost coincide with each other or shift from each other by the length p or shorter, or the second outer lines n1 and n2 almost coincide with each other or shift from each other by the length p or shorter in the above embodiments. It is preferable that the first area AR1 and the second area AR2 are narrower than the XY cross section of the SHG element 13 in the second embodiment. It is further preferable that the first area AR1 and the second area AR2 are provided within the rectangular area equivalent to the effective range E (see FIG. 8). In this case, the wavelength of the fundamental light can be efficiently converted.

Fifth Embodiment

Figure 11:
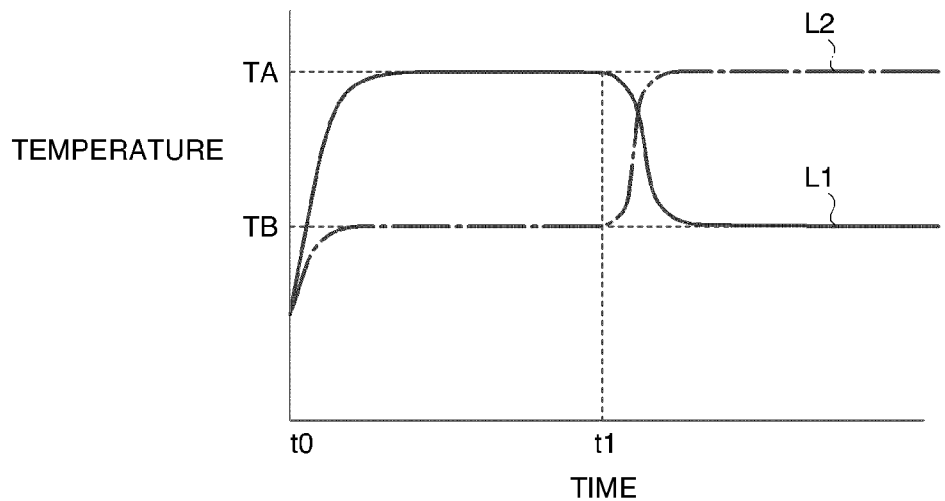
FIG. 11 illustrates driving of light source device according to a fifth embodiment of the invention.

FIG. 11 illustrates driving of a light source device according to a fifth embodiment of the invention, showing the relationship between the temperatures of the first laser emission units and the second laser emission units and time. The light source device according to this embodiment has a plurality of first laser emission units and a plurality of second laser emission units for emitting light. Driving for light emission is sequentially switched between the first laser emission units L1 and the second laser emission units L2. Driving of the first laser emission units L1 starts at time t0. The temperature of the first laser emission units L1 rises from the time t0, and comes to steady condition at a temperature TA. The temperature of the second laser emission units L2 rises from the time t0 by heat generated from the first laser emission units L1, and comes to steady condition at a temperature TB (TA>TB). It is assumed that light emission efficiency and life of the second laser emission units L2 are not affected while the temperature is TB.

After the plural first laser emission units L1 are driven from the time t0 and reach the steady condition at the temperature TA, driving is switched from the plural first laser emission units L1 to the plural second laser emission units L2 at time t1. When the driving of the second laser emission units L2 starts at the time t1, the temperature of the second laser emission units L2 rises and comes to the steady condition at the temperature TA. The temperature of the first laser emission units L1 decreases from the temperature TA, and comes to the steady condition at the temperature TB by heat generated from the second laser emission units L2. It is assumed that light emission efficiency and life of the first laser emission units L1 are not affected while the temperature is TB.

Figure 12:
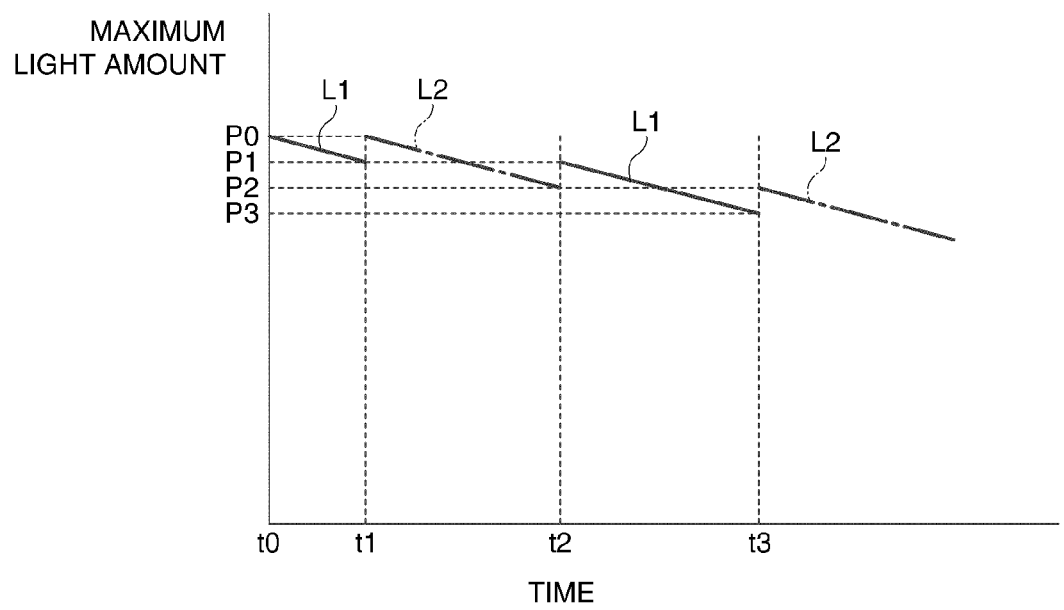
FIG. 12 shows the relationship between the maximum light amounts of first laser emission units and second laser emission units and time.

FIG. 12 shows the relationship between the maximum light amounts of the first laser emission units and the second laser emission units and time. It is assumed that each of the maximum light amounts emitted from the first laser emission units L1 and the second laser emission units L2 is P0 at the time t0. After the start of driving of the first laser emission units L1 at the time t0, the maximum light amount of the first laser emission units L1 gradually decreases with elapse of time due to deterioration caused by heat. The maximum light amount of the first laser emission units L1 is P1 (P0>P1) at the time t1 for switching driving from the first laser emission units L1 to the second laser emission units L2. Assuming that no deterioration of the second laser emission units L2 is caused by heat during the period from t0 to t1 for driving the first laser emission units L1, the maximum light amount of the second laser emission units L2 for light emission at the time t1 remains P0.

It is considered the maximum luminance difference that human eyes can recognize is about 5% when light is switched at low frequency (1 to 5 Hz) (for example, see JP-A-2005-107009, paragraph 0011). Thus, it is preferable that the maximum light amount difference ΔP (=P0−P1) at the time t1 lies within 5%. In this embodiment, a value corresponding to 5% of the initial maximum light amount P0 is set as a threshold of the maximum light amount difference ΔP in advance, and deriving is switched between the first laser emission units L1 and the second laser emission units L2 for each time the maximum light amount difference ΔP reaches the threshold.

For example, when the maximum light amount P0 is 100 at the time t0, the maximum light amount P1 of the first laser emission units L1 becomes 95 at the time t1. Switching from the first laser emission units L1 to the second laser emission units L2 is performed after the temperature of the plural first laser emission units L1 becomes the steady condition and when the difference in the maximum light amount between the plural first laser emission units L1 and the plural second laser emission units L2 reaches the threshold.

After the start of driving of the second laser emission units L2 at the time t1, the maximum light amount of the second laser emission units L2 gradually decreases with elapse of time due to deterioration by heat. The maximum light amount of the second laser emission units L2 becomes P2 (P1>P2) at the time t2 at which driving is switched from the second laser emission units L2 to the first laser emission units L1. When no deterioration of the first laser emission units L1 is caused by heat during the period t1 to t2 when the second laser emission units L2 are being driven, the maximum light amount emitted from the first laser emission units L1 remains P1 at the time t2. When the maximum light amount P1 of the first laser emission units L1 is 95 at the time t2, for example, the maximum light amount P2 of the second laser emission units L2 becomes 90 at the time t2.

Switching from the second laser emission units L2 to the first laser emission units L1 is performed after the temperature of the plural second laser emission units L2 becomes the steady condition and when the difference in the maximum light amount P2 of the plural second laser emission units L2 and the maximum light amount P1 of the plural first laser emission units L1 reaches the threshold. A time t3 for switching from the first laser emission units L1 to the second laser emission units L2 also corresponds to the time after the temperature of the plural first laser emission units L1 becomes the steady condition and when the difference between the maximum light amount P3 of the plural first laser emission units L1 and the maximum light amount P2 of the plural second laser emission units L2 reaches the threshold.

By switching driving after the temperature of the laser emission units being driven reaches the steady condition, the cycle for switching driving between the first laser emission units and the second laser emission units can be extended. In this embodiment, switching of driving between the first laser emission units and the second emission units is performed on a longer cycle than that of typical pulse driving at frequency of several Hz or higher. Moreover, by setting the threshold of the maximum light amount difference for switching driving in advance, luminance difference becomes difficult to be recognized in the structure which switches driving between the first laser emission units and the second laser emission units on along cycle. Thus, flickering caused at the time of switching driving between the first laser emission units and the second laser emission units can be reduced. Driving of the first laser emission units during the driving period of the first laser emission units and driving of the second laser emission units during the driving period of the second laser emission units may be performed by either continuous driving (CW driving) which continuously emits light or pulse driving. There is a possibility that high light emission efficiency can be obtained by the CW driving depending on the characteristics of the semiconductor element.

The threshold of the maximum light amount difference ΔP for switching driving between the first laser emission units L1 and the second laser emission units L2 is not limited to 5% of the initial maximum light amount P0, but may be appropriately set. The method in this embodiment is not limited to the case when driving is sequentially switched between the first laser emission units L1 and the second laser emission units L2, but is applicable to a structure which sequentially switches driving between laser emission units classified into three or more groups.

Sixth Embodiment

Figure 13:
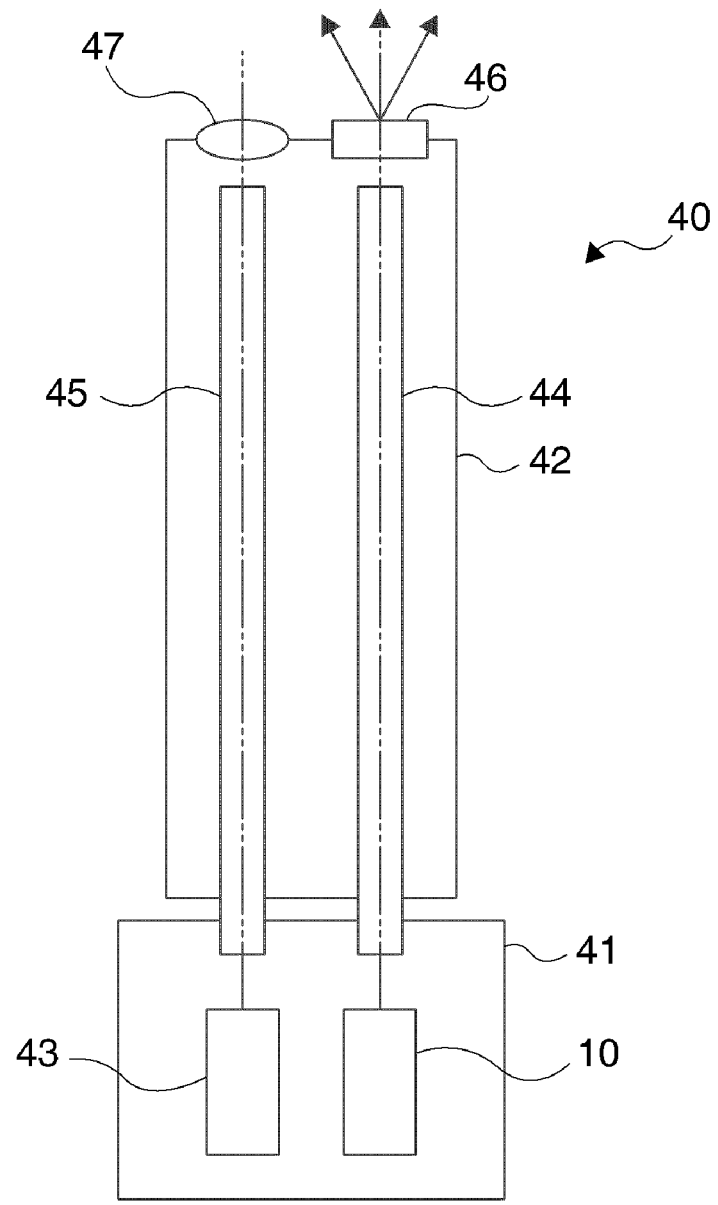
FIG. 13 schematically illustrates a monitoring device according to a sixth embodiment of the invention.

FIG. 13 schematically illustrates a structure of a monitoring device 40 according to a sixth embodiment of the invention. The monitoring device 40 includes a device main body 41 and a light transmission unit 42. The device main body 41 has the light source 10 in the first embodiment (see FIG. 1). The light transmission unit 42 has two light guides 44 and 45. A diffusion plate 46 and an image forming lens 47 are provided at the end of the light transmission unit 42 on the subject (not shown) side. The first light guide 44 transmits light emitted from the light source device 10 toward the subject. The diffusion plate 46 is provided on the light exit side of the first light guide 44. Light traveling through the first guide 44 passes the diffusion plate 46 to be diffused on the subject side. The respective components from the light source device 10 to the diffusion plate 46 on the optical path constitute a lighting device for lighting the subject.

The second light guide 45 transmits light released from the subject toward a camera 43. The image forming lens 47 is provided on the light entrance side of the second light guide 45. The image forming lens 47 converges the light from the subject on the light entrance surface of the second light guide 45. The light released from the subject enters the second light guide 45 via the image forming lens 47, transmits through the second light guide 45, and enters the camera 43.

The first light guide 44 and the second light guide 45 are formed by a number of bundled optical fibers. Light can be transmitted to a distant place by using the optical fibers. The camera 43 is provided within the device main body 41. The camera 43 is an image pickup unit for obtaining an image of the subject illuminated by the light emitted from the light source device 10. The image of the subject can be shot by the camera 43 by using the light entering from the second light guide 45 into the camera 43. By employing the light source device 10 in the first embodiment, advantages such as high efficiency and long life of the monitoring device 40 can be offered. The monitoring device 40 may have any one of the light source devices according to the above embodiments.

Seventh Embodiment

Figure 14:
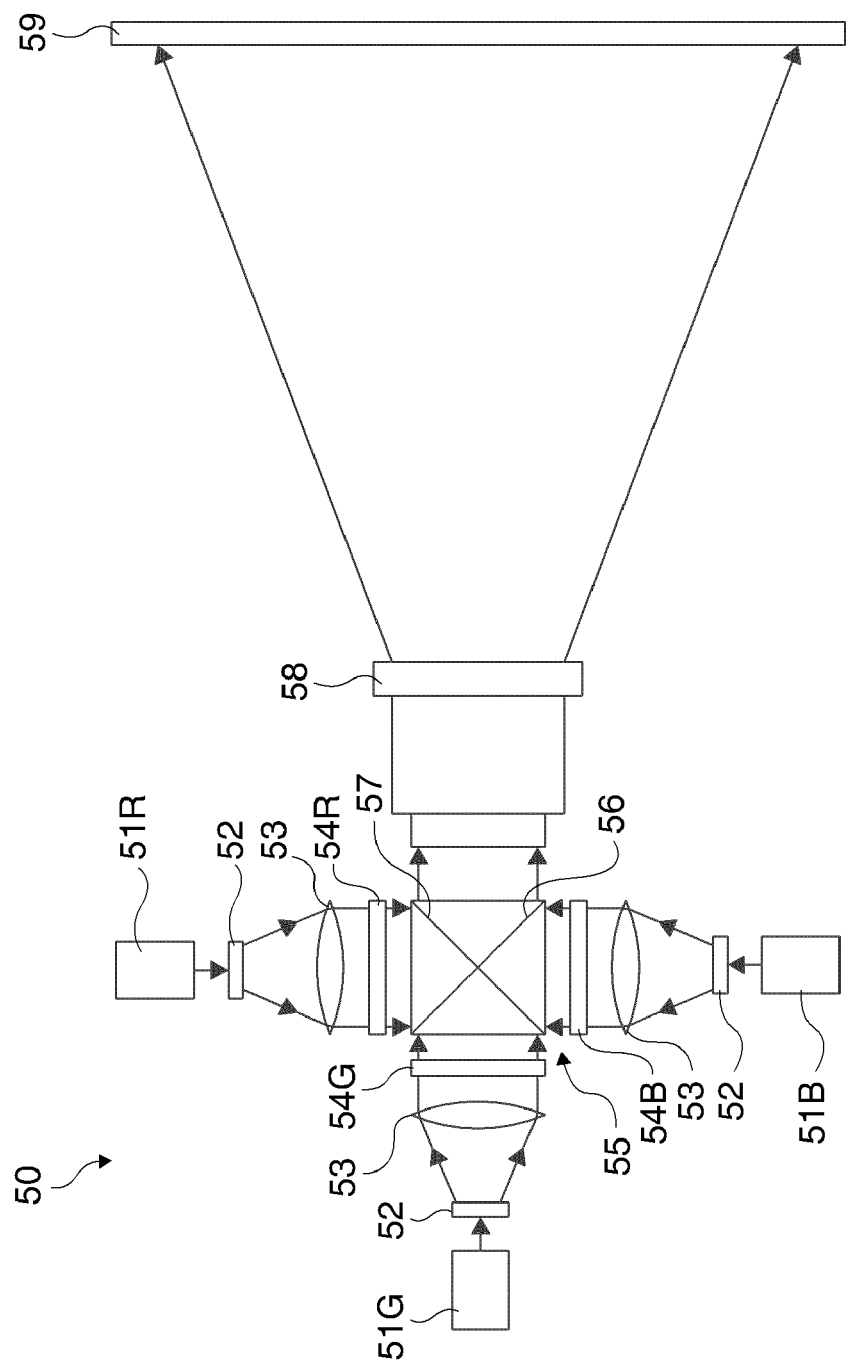
FIG. 14 schematically illustrates a projector in a seventh embodiment of the invention.

FIG. 14 schematically illustrates a projector 50 according to a seventh embodiment of the invention. The projector 50 is a front projection type projector which projects light on a screen 59 and produces images for viewing by using light reflected by the screen 59. The projector 50 includes a red color (R) light source device 51R, green color (G) light source device 51G, and blue color (B) light source device 51B. Each of the light source devices 51R, 51G and 51B has a structure similar to that of the light source device 10 in the first embodiment (see FIG. 1). The projector 50 is an image display apparatus which displays images by using lights emitted from the respective light source devices 51R, 51G and 51B.

The R light source device 51R is a light source for emitting R light. A diffusion element 52 performs shaping and enlargement of an illumination area, and equalizes light amount distribution in the illumination area. The diffusion element 52 is constituted by a computer generated hologram (CGH) as a diffraction optical element, for example. A field lens 53 collimates light emitted from the R light source device 51R and supplies the collimated light to an R light spatial light modulation unit 54R. The R light source device 51R, the diffusion element 52, and the field lens 53 constitute alighting device for lighting the R light spatial light modulation unit 54R. The R light spatial light modulation device 54R is a spatial light modulation unit which modulates R light emitted from the lighting device according to an image signal as a transmission type liquid crystal display device. The R light modulated by the R light spatial light modulating device 54R enters a cross dichroic prism 55 as a color combining system.

The G light source device 51G is a light source for emitting G light. Light having passed through the diffusion element 52 and the field lens 53 enters a G light spatial light modulation device 54G. The G light source device 51G, the diffusion element 52, and the field lens 53 constitute a lighting device for lighting the G light spatial light modulation unit 54G. The G light spatial light modulation device 54G is a spatial light modulation unit which modulates G light emitted from the lighting device according to an image signal as a transmission type liquid crystal display device. The G light modulated by the G light spatial light modulating device 54G enters the cross dichroic prism 55 through a surface different from the surface to which the R light enters.

The B light source device 51B is a light source for emitting B light. Light having passed through the diffusion element 52 and the field lens 53 enters a B light spatial light modulation device 54B. The B light source device 51B, the diffusion element 52, and the field lens 53 constitute a lighting device for lighting the B light spatial light modulation unit 54B. The B light spatial light modulation device 54B is a spatial light modulation unit which modulates B light emitted from the lighting device according to an image signal as a transmission type liquid crystal display device. The B light modulated by the B light spatial light modulating device 54B enters the cross dichroic prism 55 through a surface different from the surfaces to which the R and G lights enter. These transmission type liquid crystal display devices are constituted by high temperature polysilicon (HTPS) liquid crystal panel, for example.

The cross dichroic prism 55 has two dichroic films 56 and 57 disposed substantially orthogonal to each other. The first dichroic film 56 reflects R light and transmits G light and B light. The second dichroic film 57 reflects B light and transmits R light and G light. The cross dichroic prism 55 combines R light, G light and B light entering in different directions, and releases the combined light toward a projection lens 58. The projection lens 58 projects the light combined by the cross dichroic prism 55 toward the screen 59.

By using the respective light source devices 51R, 51G and 51B each having the structure similar to that of the light source device 10, the projector 50 obtains high efficiency and long life. Each of the light source devices 51R, 51G and 51B may be any one of the light source devices shown in the above embodiments.

The spatial light modulation device of the projector is not limited to the transmission type liquid crystal display device, but may be reflection type liquid crystal display device (liquid crystal on silicon; LCOS), DMD (digital micromirror device), GLV (grating light valve), and other devices. The projector is not limited to the one having the spatial light modulation device for each color, but may have one spatial light modulation device which modulates two, three, or more color lights. The projector is not limited to the one having spatial light modulation device, but may be a laser scan type projector which scans by laser beams emitted from a light source using a scanning unit such as galvano-mirror, and displays an image on a beam receiving surface. The projector may be a slide projector which uses a slide containing image information. The projector may be a so-called rear projector which supplies light to one surface of a screen and produces an image for viewing by using light released from the other surface of the screen.

The light source device according to the embodiment of the invention may be applied to a liquid crystal display as an image display apparatus. A lighting device for lighting a liquid crystal panel can be produced by combining the light source device according to the embodiment of the invention and a light guide plate. In this case, images having high brightness and high quality can be similarly displayed. The light source device according to the embodiment of the invention is applicable not only to the monitoring device and image display apparatus, but also to an exposing device for exposure using laser beams and optical system such as laser processing device.

Accordingly, the light source device according to the embodiment of the invention is appropriately used in a monitoring device and image display apparatus.

The entire disclosure of Japanese Patent Application No. 2007-310002, filed Nov. 30, 2007 is expressly incorporated by reference herein.

What is claimed is:

1. A light source device, comprising:
a plurality of first laser emission units and a plurality of second laser emission units for emitting light,
wherein
the plurality of first laser emission units and the plurality of second laser emission units are disposed on a flat surface,
the first laser emission units and the second laser emission units are composed so that a drive for light emission is sequentially switched, and
each of the second laser emission units is disposed between the adjoining first laser emission units,
assuming that the minimum pitch which only produces allowable effect on light emission efficiency of the plural first laser emission units and the plural second laser emission units and allowable effect on lives of the plural first laser emission units and the plural second laser emission units at the time of simultaneous driving of the plural first laser emission units and the plural second laser emission units is an allowable limit pitch,
the pitch of the respective first laser emission units is larger than the allowable limit pitch,
the pitch of the respective second laser emission units is larger than the allowable limit pitch, and
the pitch of the adjoining first laser emission units and the second laser emission units is smaller than the allowable limit pitch such that when one of the adjoining first laser emission units or the second laser emission units emits light, the other adjoining first laser emission units or second laser emission units does not emit light.

2. A light source device, comprising:

a plurality of first laser emission units and a plurality of second laser emission units for emitting light, wherein the plurality of first laser emission units and the plurality of second laser emission units are disposed on a flat surface, the first laser emission units and the second laser emission units are composed so that a drive for light emission is sequentially switched, and assuming that an area containing the plural first laser emission units on the flat surface is a first area, and that an area containing the plural second laser emission units on the flat surface is a second area, the first area includes at least a part of the second area, assuming that the minimum pitch which only produces allowable effect on light emission efficiency of the plural first laser emission units and the plural second laser emission units and allowable effect on lives of the plural first laser emission units and the plural second laser emission units at the time of simultaneous driving of the plural first laser emission units and the plural second laser emission units is an allowable limit pitch, the pitch of the respective first laser emission units is larger than the allowable limit pitch, the pitch of the respective second laser emission units is larger than the allowable limit pitch, and the pitch of the adjoining first laser emission units and the second laser emission units is smaller than the allowable limit pitch such that when one of the adjoining first laser emission units or the second laser emission units emits light, the other adjoining first laser emission units or second laser emission units does not emit light.

3. The light source device according to claim 2, wherein:

each of the first area and the second area is a rectangular area which can be defined on the flat surface by two first outer lines substantially parallel with each other and two second outer lines substantially orthogonal to the first outer lines and substantially parallel with each other;

the first outer lines of the first area and the first outer lines of the second area almost coincide with each other or shift from each other by a length between the center positions of the adjoining first laser emission unit and the second laser emission unit or shorter; and the second outer lines of the first area and the second outer lines of the second area almost coincide with each other or shift from each other by a length between the center positions of the adjoining first laser emission unit and the second laser emission unit or shorter.

4. The light source device according to claim 1, wherein the number of the first laser emission units is equal to the number of the second laser emission units.

5. The light source device according to claim 2, wherein the area of the first area is substantially equal to the area of the second area.

6. The light source device according to claim 1, wherein the first laser emission units and the second laser emission units are provided on the same substrate.

7. The light source device according to claim 1, wherein the first laser emission units and the second laser emission units are alternately disposed at least in either a first direction or a second direction substantially perpendicular to the first direction.

8. The light source device according to claim 7, wherein the first laser emission units and the second laser emission units are alternately disposed in both the first direction and the second direction.

9. The light source device according to claim 1, further comprising:

a wavelength conversion element which converts wavelengths of lights emitted from the plural first laser emission units and plural second laser emission units, wherein the plural first laser emission units and the plural second laser emission units are disposed in a region narrower than the cross section of the wavelength conversion element substantially orthogonal to light entering from the plural first laser emission units and the plural second laser emission units into the wavelength conversion element.

10. The light source device according to claim 1, wherein:

driving is switched from the plural first laser emission units to the plural second laser emission units after the temperature of the plural first laser emission units becomes steady condition; and driving is switched from the plural second laser emission units to the plural first laser emission units after the temperature of the plural second laser emission units becomes steady condition.

11. The light source device according to claim 1, wherein driving is switched between the plural first laser emission units and the plural second laser emission units every time the difference in the maximum light amount between the plural first laser emission units and the plural second laser emission units becomes a threshold set in advance.

12. A lighting device, comprising the light source device according to claim 1 to illuminate an illumination target using light emitted from the light source device.

13. A monitoring device, comprising:

the lighting device according to claim 12; and an image pickup unit which obtains an image of a subject illuminated by the lighting device.

14. An image display apparatus comprising the light source device according to claim 1 to display an image using light emitted from the light source device.

* * * * *